Figure 1:
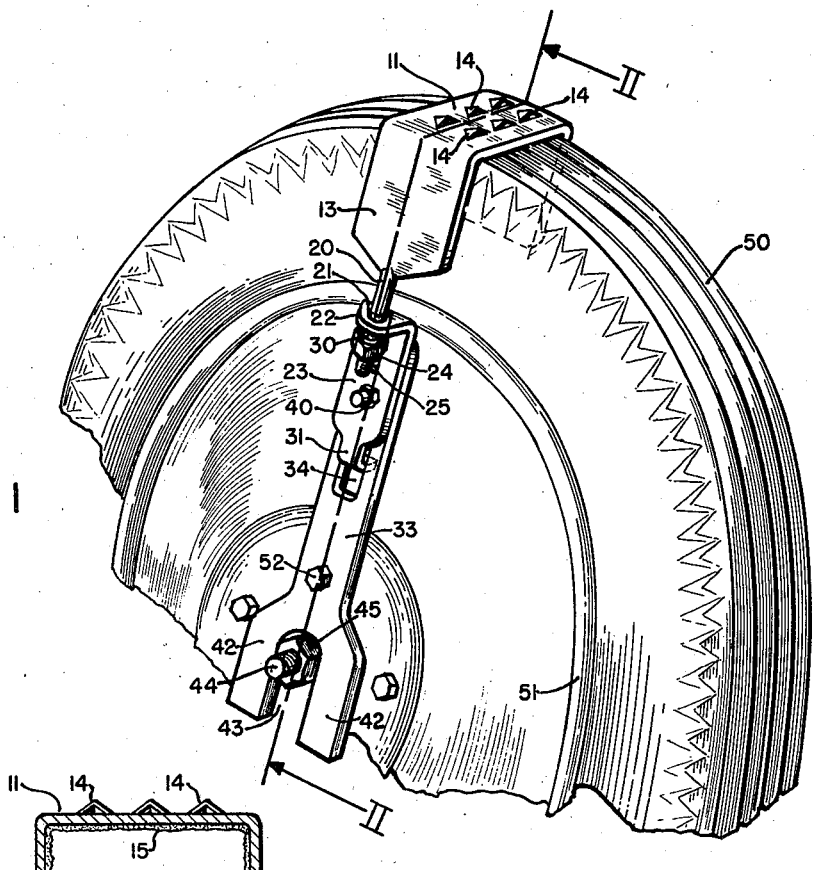

Jan. 11, 1949.  R. F. MacKAY  2,458,522
TRACTION AIDING DEVICE FOR
SELF-PROPELLED VEHICLES
Filed Nov. 7, 1946

INVENTOR
RAYMOND F. MACKAY

BY *M. O. Hayes*
ATTORNEY

Patented Jan. 11, 1949

2,458,522

UNITED STATES PATENT OFFICE 2,458,522

TRACTION AIDING DEVICE FOR SELF-PROPELLED VEHICLES

Raymond F. MacKay, Worcester, Mass.

Application November 7, 1946, Serial No. 708,364

6 Claims. (Cl. 152—229)

(Granted under the act of March 3, 1883, as amended April 30, 1928; 370 O. G. 757)

This invention relates to vehicular traction devices, and more particularly to devices for improving the traction of vehicular drive wheels employing tires of the pneumatic type.

During weather conditions, such as sleet storms, that tend to reduce the coefficient of friction of the hard surface highways by covering the highway surface with a film of ice, self-propelled vehicles, such as automobiles, experience great difficulty in proceeding upward along hills and inclines. There is available for attachment to automobile driving wheels the well known anti-skid chain that holds a series of cross chains across the tread of the tire at regular intervals along its periphery. With such an anti-skid chain located on the tires of both driving wheels, the difficulty of ascending icy inclines is measurably reduced, or eliminated entirely. However, the weather conditions that occur to produce a layer of ice on the highway surface do not lend themselves to accurate prediction and also occur rapidly. With the appearance of a coating of ice on the highways, it becomes necessary to provide a device that may be readily installed on a vehicle to provide the required tractive effort to propel the vehicle along the icy highway.

The use of the usual anti-skid chain is generally precluded as these anti-skid chains are at best, rather awkward and difficult to apply to the tire of the driving wheel, requiring access to both the inside and outside of the tire at at least one point on its periphery, and further requiring a method of placing the cross-chains at their proper interval along the periphery of the tread of the tire. When a vehicle operator finds a condition of icy highways, great difficulty is experienced in applying the anti-skid chain to the tire; and, furthermore, if the vehicle has proceeded to a point where both forward and rearward progress are prevented by the presence of a coating of ice on the highway surface, extreme difficulty is encountered in applying the anti-skid chain to the tire.

A device commonly used for increasing the traction of the tires of the driving wheels of a vehicle under conditions of an icy coating on the highway surface employs one or two cross-chains. These are secured at any point on the periphery of the tire by completely encircling the tire and the wheel rim by a combination of a strap and the cross-chains so secured that the cross chains are located across the tread of the tire, and the strap is located around the inner surface of the rim. It may be readily seen that this device, referred to as either a cross chain or a "mud-hook," is capable of use only with wheels of the spoke type or with disc wheels having holes through the disc at or near the outer periphery. It will also be apparent that in order to place these mud-hooks about a tire and rim, it will be necessary to have access at the point of application to both the inner and outer sides of the wheel and tire. Despite this difficulty in application, it is possible to install a single mud-hook much more readily than an anti-skid chain and generally this single mud-hook on each driving wheel provides sufficient traction for the driving wheels for the vehicle to proceed along ice coated highways to either the destination or a service station where the anti-skid chain may be installed.

In this invention a device is disclosed in which a strip of metal having a highly roughened outer surface and a lightly roughened inner surface is positioned across the tread of the tire. The lightly roughened surface is held against the tread of the tire to prevent slippage of the device relative to the tire and the highly roughened surface provides a propelling force to the tire when in contact with the icy highway. This strip of metal is further maintained in position by extensions on the trip that embrace the sidewalls of the tire, and still further by securing the outer extension through an adjustable sliding member to the wheel hub by means of a wheel bolt.

The advantages of this device over the previously mentioned mud-hook is the ease with which this device may be installed. As hereinbefore stated, the mud-hook requires access to both the inner and outer sides of the tire for application; and also with the present trend of automobile wheels toward the disc type, it is generally very difficult to pass the strap of the mud-hook through the very small openings left in the disc. The present device on the other hand, requires access to only the outer side of the tire and may be readily installed regardless of the style and resting place of the wheel.

It is, therefore, a primary object of this invention to provide a traction aiding device for the drive wheels of self-propelled vehicles.

Another object of this invention is to provide a traction device for the drive wheels of a vehicle employing pneumatic tires capable of installation and removal with access to only the outer side of the wheels.

Figure 2:
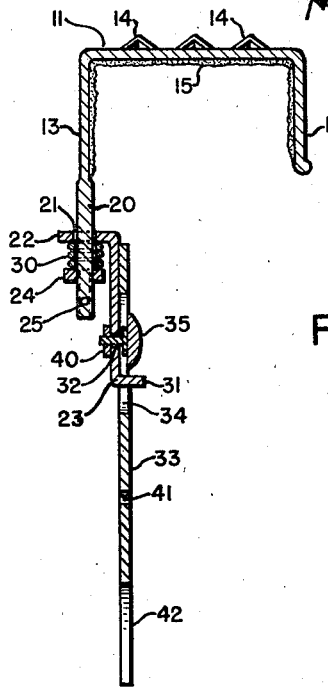

These and other objects will become apparent to those skilled in the art from the following description when taken with the accompanying drawings in which:

Fig. 1 is a view in perspective showing a portion of an automobile wheel and tire with one embodiment of the invention mounted thereon; and Fig. 2 is a front sectional elevation view of the embodiment of Fig. 1 with section taken along line II—II of Fig. 1.

Referring to the diagrams, a traction plate 11 has integrally connected to its respective ends an inner gripping plate 12 and an outer gripping plate 13. The outwardly directed surface of traction plate 11 is highly roughened as for example, by a multiplicity of pyramidal shaped irregularities 14; and on the inwardly directed surfaces of traction plate 11 and gripping plate 12 and 13 is a gripping coating 15 of tar or tar derivative. The free end of outer gripping plate 13 is joined to rod 20 which passes through hole 21 in bracket 22 of member 23. The free end of rod 20 protruding through hole 21 is threaded and has a small hole therethrough for the reception of lock nut 24 with its associated cotter pin 25. A compression spring 30 is located between bracket 22 and lock nut 24. The lower end of member 23 has a projection 31 thereon and the lower portion of member 23 has a hole 32 therethrough.

Supporting member 33 contains a slot 34 in its upper portion substantially longer than the distance between hole 32 and projection 31 of member 23 which simultaneously receives projection 31 and carriage bolt 35. Carriage bolt 35, passing through slot 34 and hole 32 and secured by nut 40, in cooperation with projection 31 serves to rigidly clamp member 23 to support member 33.

Referring to Fig. 1, the lower extremity of supporting member 33 is bifurcated, forming two parallel arms 42, 42 with an opening 43 therebetween for receiving axle 44 and axle nut 45 when the traction device is in operating position on tire 50 and wheel 51. Wheel bolt 52 passes through hole 41, Fig. 2, in support member 33 to attach it securely to the wheel 51.

Prior to using this traction device, it is recommended that the distance between coating 15 of traction plate 11 and hole 41 in support member 33 be adjusted for use on a particular size drive wheel by properly positioning member 23 with respect to support member 33 and rigidly clamping these together by carriage bolt 35 and nut 40. This distance with compression spring 30 fully compressed should be equal to the radial distance from wheel bolt 52 to the nearer point of the tread of tire 50. This distance should be adjusted with wheel bolt 52 in its uppermost position as the tread to bolt distance is the greatest under this condition. A simple way to achieve this adjustment is to apply the traction device to the wheel and, when properly positioned, to tighten nut 40 on carriage bolt 35. This pre-adjustment will obviate delay at the time when the weather conditions make it mandatory to use some sort of traction aiding device.

In the use of this traction device, the hub cap of wheel 51 is removed and also wheelbolt 52, the uppermost wheelbolt securing wheel 51 to its respective brakedrum. The tools required for this operation are a screwdriver and a wheelbolt wrench, which are generally combined in a single unit and is usually standard equipment in the tool compartment of most automobiles. Traction plate 11 is then placed across and brought into contact with the tread of tire 50 by means of support member 33, which is positioned with hole 41 directly over the hole from which wheelbolt 52 was previously removed. This wheelbolt is then replaced and tightened to hold support member 33 rigidly upon wheel 51.

In the region of tire 50 where the tread comes in contact with the highway or other surface by which the wheel 51 is being supported, the tread of tire 50 is indented due to the direct application of the weight of the vehicle and results in the sidewalls of tire 50 being expanded outwardly. Therefore, as traction plate 11 approaches this region of contact between the tread of tire 50 and the supporting surface, the sidewalls of tire 50 are forced outward against gripping plates 12 and 13 which due to coating 15 maintain traction plate 11 firmly in position on tire 50. The force developed by the highly roughened outer surface of traction plate 11 is transmitted to the vehicle through tire 50 and wheel 51 without producing great stress in member 23 or support member 33. It may be seen that the function of support member 33 is to maintain traction plate 11 in its proper position as it passes through the upper portion of its circular path about axle 44 and not during the period when traction plate 11 is serving to provide the propelling force to the vehicle.

The sliding relation between rod 20 and bracket 22 is included to permit traction plate 11 to follow the indentations occurring in the tread of tire 50 as it revolves. Arms 42, 42 aid wheelbolt 52 in maintaining the device in the proper position during the rotation of wheel 50. The opening 43 is of such a length as to permit the use of the device on vehicles having various distances between the wheelbolts and the axle.

From Fig. 1 it will be apparent that the device may be applied to the wheel of the vehicle with access solely to the outer side of wheel 50. This feature makes the task of installation much simpler than that required for other traction aiding devices requiring access to both the inner and outer surfaces of the wheel.

The invention described in the foregoing specification need not be limited to the details shown, which are considered to be illustrative of one form the invention may take.

The invention described herein may be manufactured and used by or for the Government of the United States of America for Government purposes without the payment of any royalty thereon or therefor.

What is claimed is:

1. A traction aiding device for application to an automobile drive wheel tire having a substantially circular tread and spaced side walls attached to said tread at the edges thereof, said device comprising at least one traction plate having one surface thereof roughened, first and second gripping plates, one of said gripping plates being rigidly attached to each end of said traction plate permitting said gripping plates to embrace opposite sidewalls of said tire when said traction plate is disposed transversely of the tread of said tire with said roughened surface directed outwardly, the spacing between said gripping plates being substantially less than the unrestrained spacing between the side walls of said tires in the vicinity of the point of contact of said tire with the highway, a frictional coating applied to the inwardly directed surfaces of said traction plate and said gripping plates, a support member, said support member having an opening in one end for the reception of the axle of said drive wheel and a hole therethrough for the accommodation of a wheel bolt of said drive wheel for attaching said support member to said drive wheel, and variable and adjustable means for connecting one of said gripping plates to said support member.

2. A traction aiding device for application to an automobile drive wheel tire comprising a traction plate having one roughened surface, first and second gripping plates, one of said gripping plates being attached to each end of said traction plate permitting said gripping plates to embrace the opposite sidewalls of said tire when said traction plate is disposed transversely of the tread of said tire with said roughened surface directed outwardly, a frictional coating on the inwardly directed surfaces of said traction plate and said gripping plates for substantially precluding slippage of said traction plate along said tire, a support member having an opening in one end thereof for the reception of the axle of said drive wheel, a hole in said support member adapted to receive a wheel bolt of said drive wheel for clamping said support member to said drive wheel, and a slot in said support member, a bracket adapted to be adjustably clamped to said support member at said slot, and a rod connected to one of said gripping plates and slidably connected to said bracket, said rod connecting said gripping plate through said bracket and said support member to said drive wheel.

3. A traction aiding device for use on a vehicle having a pneumatic tire having a circular tread and spaced side walls attached to said tread at the edges thereof, said device comprising a first and a second gripping plate, means connecting said gripping plates and adapted to support said gripping plates on opposite sides of said pneumatic tire in a fixed space relationship, the spacing between said gripping plates being substantially less than the unrestrained width between the side walls of said tire at points in the vicinity of the point of contact of said tire with the highway whereby lateral pressure is exerted between the side walls of said tire and said gripping plates as said gripping plates approach said point of contact, means to secure one of said gripping plates to said drive wheel, and traction aiding means extending between said first and second gripping plates.

4. A traction aiding device for use on a vehicle having a pneumatic tire having a circular tread and spaced side walls attached to said tread at the edges thereof, said device comprising a first and a second gripping plate, means connecting said gripping plates and adapted to support said gripping plates on opposite sides of said pneumatic tire in a fixed space relationship, the spacing between said gripping plates being substantially equal to the unrestrained width of said tire at a point opposite the point of contact of said tire with the highway whereby the lateral pressure between said side walls and said gripping plates varies from substantially zero at a point opposite said point of contact to a maximum in the vicinity of said point of contact, means to secure one of said gripping plates to said drive wheel, and traction aiding means extending between said first and second gripping plates.

5. A traction aiding device for use on an automobile drive wheel tire having a circular tread and spaced side walls attached to said tread at the edges thereof, said device comprising, a traction plate, first and second gripping plates, each of said gripping plates being rigidly connected to an end of said traction plate thereby permitting said gripping plates to embrace the side walls of said tire on said drive wheel when said traction plate is located transversely of the tread of said tire, the spacing between said gripping plates being substantially less than the unrestrained spacing between the side walls of said tire in the vicinity of the point of contact of said tire with the highway, the outwardly directed surface of said traction plate being roughened, a gripping coating on the inwardly directed surfaces of said traction plate and said gripping plates, the frictional force between said coating and said tire tending to prevent relative movement of said traction plate and said tire in the vicinity of said point of contact, and means extending radially of said drive wheel for securing one of said gripping plates to said drive wheel.

6. A traction aiding device for use on an automobile drive wheel tire having a circular tread and spaced side walls at said tread at the edges thereof, said device comprising, a traction plate, first and second gripping plates, each of said gripping plates being rigidly connected to an end of said traction plate thereby permitting said gripping plate to embrace the side walls of said tire on said drive wheel when said traction plate is located transversely of the tread of said tire, the spacing between said gripping plates being substantially equal to the unrestrained spacing between the side walls of said tire at a point diametrically opposite the point of contact of said tire with the highway, the outwardly directed surface of said traction plate being roughened, a gripping coating on the inwardly directed surfaces of said traction plate and said gripping plates, the frictional force between said coating and said sidewalls tending to prevent relative movement of said traction plate and said tire in the vicinity of said point of contact, said frictional force varying from an minimum value at said point opposite said point of contact to a maximum value in the vicinity of said point of contact, and means extending radially of said drive wheel for securing one of said gripping plates to said drive wheel.

RAYMOND F. MacKAY.

REFERENCES CITED

The following references are of record in the file of this patent:

UNITED STATES PATENTS

| Number | Name | Date |
|---|---|---|
| 1,568,581 | Albert | Jan. 5, 1926 |
| 2,212,076 | Rollings | Aug. 20, 1940 |
| 2,397,277 | Lawrence | Mar. 26, 1946 |